United States Patent [19]
Engle

[11] Patent Number: 5,661,593
[45] Date of Patent: *Aug. 26, 1997

[54] LINEAR ELECTROSTATIC MODULATOR

[76] Inventor: Craig D. Engle, 336 Cline Ave., Griffith, Ind. 46319

[*] Notice: The term of this patent shall not extend beyond the expiration date of Pat. No. 5,640,266.

[21] Appl. No.: 522,591

[22] Filed: Sep. 1, 1995

Related U.S. Application Data

[63] Continuation-in-part of Ser. No. 955,058, Oct. 1, 1992, Pat. No. 5,488,505.

[51] Int. Cl.$^6$ .................................................. G02B 26/00
[52] U.S. Cl. .................................................. 359/292
[58] Field of Search ..................... 359/291, 292

[56] References Cited

U.S. PATENT DOCUMENTS

| | | | |
|---|---|---|---|
| 3,798,620 | 3/1974 | Cosentino | 340/173 |
| 3,840,695 | 10/1974 | Fischer | 358/61 |
| 4,317,611 | 3/1982 | Peterson | 350/6.6 |
| 4,596,992 | 6/1986 | Hornbeck | 346/76 PH |

OTHER PUBLICATIONS

Engle, Craig D. Enhanced Membrane Light Modulator, U.S. application No. 07/958,642, filed Oct. 7, 1992.
Paul K, Weimer, chapter 9, Thin Film Transistors, "Field Effect Transistors, Physics, Technology and Applications", Wallmark and Johnson, Prentice-Hall.
Engle, Craig D. Electrostatic Light Valve System Configuration, U.S. application No. 08/515,808, filing date Aug. 16, 1995.

*Primary Examiner*—Bruce Anderson

[57] ABSTRACT

A plurality of reflective conductors (28) are affixed to an insulating substrate (12). Each reflective conductor (28) overlaps and is separated from a first electrode (18) affixed to the substrate (12) thereby forming a plurality of capacitive pixel elements (32). Each capacitive pixel element (32) is electrically connected to a respective thin film transistor (40) to assist in controlling the potential difference applied to the pixel element (32). Varying each potential difference varies separation between the reflective conductor (28) and first electrode (18) thereby phase modulating a wavefront incident thereon. Thin film transistors (40) are formed on the substrate (12).

3 Claims, 1 Drawing Sheet

5,661,593

LINEAR ELECTROSTATIC MODULATOR

RELATED APPLICATION

This application is a continuation in part of earlier application U.S. Ser. No. 07/955,058 filed Oct. 1, 1992, U.S. Pat. No. 5,488,505 of Craig D. Engle for An Enhanced Electrostatic Shutter Mosaic Modulator.

BACKGROUND: FIELD OF INVENTION

This invention relates to thin film electronic interfaces for use with electrostatic light modulators.

BACKGROUND: PRIOR ART

As identified in the patent application submitted by Craig D. Engle titled "Enhanced Membrane Light Modulator" Ser. No. 07/958,642, filed Oct. 7, 1992, prior electrostatic light modulator art has utilized an electrode structure which impedes and/or is contrary to thin film component integration. Prior art concerning electrostatic light modulators include U.S. Pat. No. 3,798,620, to Cosentino, Mar. 19, 1974. U.S. Pat. No. 3,798,620, utilizes discrete switching components which are bonded to the substrate. As identified in the referenced application Craig D. Engle, U.S. Pat. No. 3,798,620 requires each switching element to accommodate a crossover buss. As to be shown herein, more desirable alternatives exist.

OBJECTS AND ADVANTAGES

Accordingly, several objects and advantages of my invention are:

1) To identify how to integrate thin film switching elements with electrostatic light valves.
2) To identify thin film switching components which are utilizable with my invention.
3) To identify how my invention enhances reliability of electrostatic light modulators.
4) To identify benefits of utilizing insulating substrates with electrostatic light modulators.

Further objects and advantages of my invention will become apparent from a consideration of the drawings and ensuing description of it.

DESCRIPTION OF INVENTION

Figure 1:
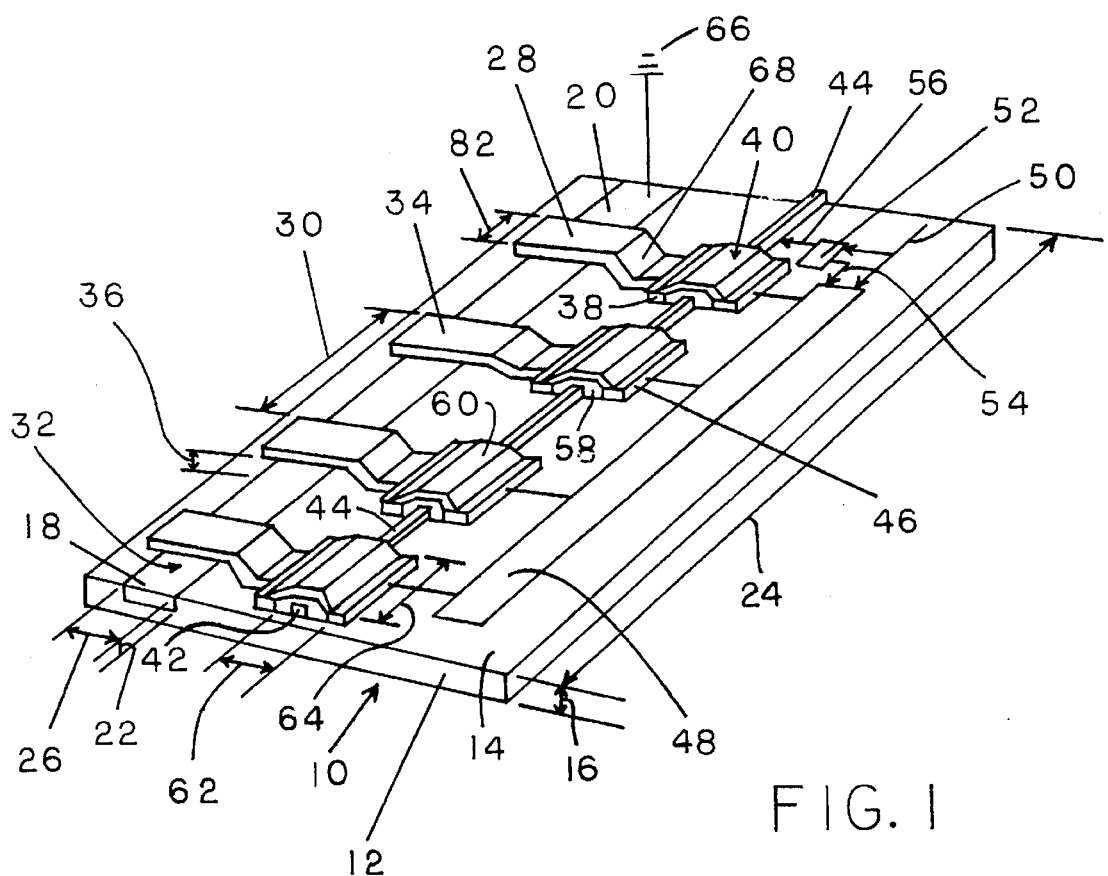
FIG. 1 shows a linear electrostatic light modulator array addressed with thin film electronic switching components.

FIG. 1 shows a linear spatial light modulator array 10. Array 10 further includes an insulating substrate 12. Substrate 12 further includes a first major surface 14 and a second major surface. The second major surface of substrate 12 is not visible in the figure. Surface 14 and the second major surface are essentially parallel planes separated by a substrate thickness 16. Thickness 16 is perpendicular to surface 14.

Affixed to substrate 12 is a first electrode 18. Electrode 18 further includes a first electrode surface 20 and a second electrode surface. The second electrode surface is not visible in the figure. Surface 20 and the second surface of electrode 18 are essentially parallel planes separated by an electrode thickness 22. Thickness 22 is perpendicular to surface 20 and parallel to thickness 16. Electrode 18 further includes an electrode length 24 and an electrode width 26. Width 26 is perpendicular to thickness 16 and length 24. Length 24 is perpendicular to thickness 16.

Electrode 18 is embedded in substrate 12. Embedding electrode 18 in substrate 12 further includes surface 20 being coplanar with surface 14. Techniques to embed electrodes in a substrate include etching the substrate and vacuum depositing a conductive material in the etched portion of the substrate. Such techniques are well understood by those knowledgeable in the state of the art.

Affixed to substrate 12 is a plurality of optically reflective conductive flaps 28. Adjacent flaps 28 are displaced by a first period 30. Period 30 is parallel to length 24. Techniques to affix reflective conductive flaps to an insulating substrate are described in the references cited herein.

Electrode 18 forms with each flap 28 a respective capacitive pixel element 32. In an unenergized state, a flange portion 34 of each flap 28 is separated from electrode 18 by a capacitor thickness 36. Thickness 36 is parallel to thickness 16. Flange portion 34 of each flap 28 further includes a flange width 82. Width 82 is parallel to length 24. Each flap 28 is electrically connected to a drain electrode 58 of a respective thin film transistor 40.

Each thin film transistor 40 is shown in a coplanar electrode structure. Thin film transistors 40 are formed on substrate 12. Techniques to form thin film transistors on a substrate include vacuum deposition techniques. Such techniques include sputtering and evaporation. Forming thin film transistors on an insulating substrate by a vacuum deposition techniques represents a suitable means to affix thin film transistors to a substrate. Alternative techniques to form and/or affix thin film transistors to an insulating substrate include chemical techniques. Information concerning thin film electrode structures and vacuum deposition techniques for forming thin film transistors is provided in the reference titled "Field Effect Transistors, Physic, Technology and Applications" edited by Wallmark and Johnson, Prentice-Hall, chapter 9, titled "Thin Film Transistors" by Paul K. Weimer.

Each transistor 40 further includes a gate electrode 42. Electrodes 42 are electrically connected by a gate buss 44. Each transistor 40 further includes a source electrode 46. Each source electrode 46 is electrically connected to a shift register 48. Shift register 48 is shown in a block diagram form for simplicity. An information bearing signal 50 is applied to register 48 and a clock means 52. Clock means 52 applies a first clock signal 54 to register 48 and a strobe signal 56 to buss 44.

Each transistor 40 further includes an insulating layer 58 and a semiconductor layer 60. In a coplanar electrode structure layer 60 is deposited over a metalization layer formed on the substrate which includes gate electrode 42, and layer 58 formed on substrate 12. Drain electrode 38 and source electrode 46 of each transistor 40 are separated by a first channel dimension 62. Dimension 62 is parallel to electrode width 26. Each transistor 40 further includes a second channel dimension 64. Dimension 64 is parallel to length 24. Utilizing the coplanar electrode structure and orientating the transistors in a manner described herein enables the gate buss to avoid electrical crossovers width the interconnects associated with the drain and source electrodes of each transistor.

Signal 50 is periodic and register 48 samples signal 50 in response to clock signal 54. A respective sample of signal 50 is applied to source electrode 46 of each transistor 40. In response to signal 56 applied to gate buss 44, transistors 40 change impedance state and transfers the sample value applied to the source electrode 46 to drain electrode 38 of the transistor 40. Electrode 18 is electrically connected to a ground potential 66. Transferring sample values to drain electrode 38 of the transistor 40 electrically connected to the flap 28 of the pixel element 32 enables a potential difference to be applied to each pixel element 32. Varying the potential difference applied between flap 28 and electrode 18 of each element 32 results in the flap 28 of the pixel element 32 deforming as a function of the potential difference applied to the pixel element 32. A wavefront incident on the reflective conductors is modulated in accordance with the information bearing signal. Shift register architecture for transferring samples values to a linear array are well understood by those knowledgeable in the stat of the art. See for instance U.S. Pat. No. 3,840,695, to Fischer, Oct. 8, 1974. The shift register and clock means form a potential control means to apply a respective potential difference to each pixel element.

Varying the potential difference applied to each pixel element 32 varies the separation between flap 28 of the pixel element 32 and electrode 18. Varying the separation varies the modulation imparted to a wavefront incident thereon. The modulation imaparted to the wavefront can exhibit phase and/or amplitude dominant characteristics depending upon the particular implementation associated with the reflective conductor. A resilient hinge portion 68 of each flap 28 provides a restoring force which counteracts the electrostatic force applied to the flap 28 due to the potential difference applied to the pixel element 32. Such considerations for a variety of reflective conductor geometries are well understood by those knowledgeable in the state of the art. See for instance U.S. Pat. No. 4,317,611 to Peterson, Mar. 2, 1982. Electric fields and/or electrostatic forces are not shown in the figure for convenience. The wavefront is not shown in the figure for convenience.

Forming thin film transistors on the substrate and utilizing the arrangement of components described herein avoids extraneous components implemented in prior art. Furthermore, by arranging components of the switch array in the manner described, thereby eliminating electrical crossovers, enhances reliability. As is evident, several benefits are provided by my invention.

Figure 2:
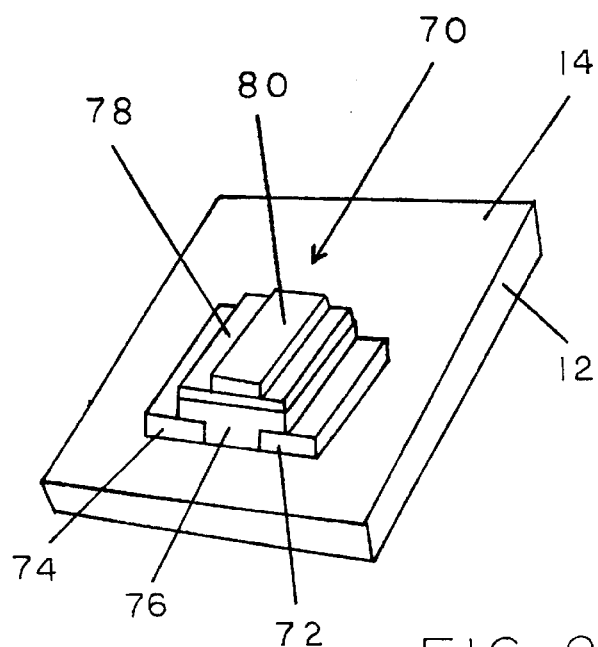
FIG. 2 shows a thin film transistor formed on an insulating substrate possessing a staggered electrode structure.

Alternative transistor electrode structures are utilizable in my invention. FIG. 2 shows a thin film transistor 70 utilizing a staggered electrode structure. Transistor 70 further includes a source electrode 72 and a drain electrode 74 affixed to surface 14 of substrate 12. Transistor 70 further includes a semiconductor layer 76 in contact with surface 14. Overlapping semiconductor layer 76 is an insulating layer 78. Affixed to insulating layer 78 is a gate electrode 80. Techniques for forming thin film transistors are described in the references are cited herein. Only a single transistor is shown in the figure for convenience. In addition, portions of the substrate have been shown cut-away for convenience.

Conclusions, Ramifications and Scope of Invention

Thus the reader will see that the spatial light modulator of my invention enhances reliability by eliminating electrical crossover networks in the array of electrical switching components allowing implementation of thin film components while eliminating extraneous components. While my above description contains many specificities, these should not be construed as limitations on the scope of the invention, but rather as an exemplification of one preferred embodiment thereof. Many other variations are possible. For example, a variety of thin film components are capable of being utilized with my invention. Thin film diodes are capable of being formed from thin film transistors. Varistors are capable of being utilized as a thin film switching component with my invention.

Several materials are utilizable for the insulating substrate of my invention. Substrate materials include glass, ceramics and Saphire. Materials utilizable for electrodes include Aluminum. Materials utilizable for semiconductor layers include CdSe and materials utilizable for gate insulator layers include Aluminium Oxide.

Although the electronic switching elements of my invention have been described as thin film switching elements, as is readily apparent from utilizing the information provided herein, several additional electronic switching elements are utilizable in my invention including any type of electronic switching element with a semiconductor layer in contact with the substrate.

Use of insulating substrates provides several advantages including facilitating system interfaces to enhance control of the pixel elements. See for instance the configurations identified in patent application titled "Electrostatic Light Valve System Configurations" submitted by Craig D. Engle, mailed Aug. 16, 1995.

Accordingly, the scope of the invention should be determined not by the embodiments illustrated, but by the appended claims and their legal equivalents.

I claim:

1. An electrostatic spatial light modulator comprising:
   an insulating substrate,
   a capacitive pixel element comprising:
      first electrode means affixed to said substrate,
      reflective conductor means affixed to said substrate overlapping and separated from said first electrode means,
   an electronic switch,
   said electronic switch comprises a first terminal, a second terminal and a third terminal,
   said first terminal to said electronic switch is electrically connected to said pixel element,
   said electronic switch comprises a device selected from the group consisting of a) thin film transistors formed on said substrate and b) threshold device pairs affixed to said substrate coupled together at said first terminal of said electronic switch in non-opposing series relation, said threshold devices being of the type which provides a low impedance to current flow when forward biased into an on condition,
   potential control means for applying to said pixel element a potential difference comprising:
      means operatively associated with said control means electrically connected to said second terminal of said electronic switch to enable said potential difference to be dependent on a potential applied to said third terminal of said electronic switch,
   whereby varying said potential difference varies separation between said reflective conductor means and said first electrode means of said pixel element thereby modulating a wavefront incident on said reflective conductor means.

2. An electrostatic spatial light modulator comprising:
   an insulating substrate,
   first electrode means affixed to said substrate,
   reflective conductor means affixed to said substrate overlapping and separated from said first electrode means to form a plurality of capacitive pixel elements,
   a plurality of electronic switches, each said electronic switch comprises a first terminal, a second terminal and a third terminal, said first terminal of each said electronic switch is electrically connected to a respective pixel element, each said electronic switch comprises a device selected from the group consisting of a) thin film transistors formed on said substrate and b) threshold device pairs affixed to said substrate coupled together at said first terminal of said electronic switch in non-opposing series relation, said threshold devices being of the type which provides a low impedance to current flow when forward biased into an on condition, potential control means including said electronic switches for applying to each said pixel element a respective potential difference which is dependent upon a first potential applied to said third terminal of said electronic switch electrically connected to said pixel element, means operatively associated with said control means varying said potential differences which varies separation between said reflective conductor means and said first electrode means of the pixel element thereby modulating a wavefront incident on said reflective conductor means of said pixel element.

3. An electrostatic spatial light modular comprising:

an insulating substrate, a plurality of pixel elements, each said pixel element comprising: first electrode means affixed to said substrate, reflective conductor means affixed to said substrate overlapping and separated from said first electrode means, a plurality of electronic switches, each said electronic switch comprises a first terminal, a second terminal and a third terminal, said first terminal of each said electronic switch is electrically connected to a respective pixel element, each said electronic switch comprises a device selected from the group consisting of a) thin film transistors formed on said substrate and b) threshold device pairs affixed to said substrate coupled together at said first terminal of said electronic switch in non-opposing series relation, said threshold devices being of the type which provides a low impedance to current flow when forward biased into an on condition, potential control means to apply to each said pixel element a respective potential difference comprising:

means operatively associated with said control means electrically connected to said second terminal of each said electronic switch to enable said potential difference applied to each said pixel element to be dependent on a potential applied to said third terminal of said electronic switch electrically connected to said pixel element, whereby varying said potential difference applied to each said pixel element varies separation between said reflective conductor means and said first electrode means of the pixel element thereby modulating a wavefront incident on said reflective conductor means of said pixel element.

* * * * *